US012086558B2

(12) United States Patent
Malik et al.

(10) Patent No.: US 12,086,558 B2
(45) Date of Patent: Sep. 10, 2024

(54) SYSTEMS AND METHODS FOR GENERATING MULTI-LANGUAGE MEDIA CONTENT WITH AUTOMATIC SELECTION OF MATCHING VOICES

(71) Applicant: Warner Bros. Entertainment Inc., Burbank, CA (US)

(72) Inventors: Aansh Malik, Burbank, CA (US); Ha Thanh Nguyen, Fullerton, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 247 days.

(21) Appl. No.: 17/196,285

(22) Filed: Mar. 9, 2021

(65) Prior Publication Data

US 2021/0279427 A1    Sep. 9, 2021

Related U.S. Application Data

(60) Provisional application No. 63/085,738, filed on Sep. 30, 2020, provisional application No. 62/987,141, filed on Mar. 9, 2020.

(51) Int. Cl.
*G06F 40/47* (2020.01)
*G06F 40/58* (2020.01)
(Continued)

(52) U.S. Cl.
CPC .............. *G06F 40/47* (2020.01); *G06F 40/58* (2020.01); *G10L 15/005* (2013.01); *G10L 15/16* (2013.01)

(58) Field of Classification Search
CPC ................... G10L 13/00; G10L 13/033; G10L 13/0335; G10L 13/04; G10L 13/047; G10L 13/08;
(Continued)

(56) References Cited

U.S. PATENT DOCUMENTS 9,748,914 B2    8/2017   Antonelllis et al.
10,930,263 B1*  2/2021   Mahyar ................. G06N 3/088
(Continued)

FOREIGN PATENT DOCUMENTS

WO    2019179036 A1    9/2019

OTHER PUBLICATIONS

Obin, Nicolas; Roebel, Axel; "Similarity Search of Acted Voices for Automatic Voice Casting", 2016, IEEE, IEEE/ACM Transactions on Audio, Speech, and Language Processing vol. 24, No. 9, pp. 1642-1651 (Year: 2016).*

(Continued)

*Primary Examiner* — Hai Phan
*Assistant Examiner* — Alexander Joongie Kim
(74) *Attorney, Agent, or Firm* — Bookoff McAndrews, PLLC

(57) ABSTRACT

A method and system for automated voice casting compares candidate voices samples from candidate speakers in a target language with a primary voice sample from a primary speaker in a primary language. Utterances in the audio samples of the candidates speakers and the primary speaker are identified and typed and voice samples generated that meet applicable utterance type criteria. A neural network is used to generate an embedding for the voice samples. A voice sample can include groups of different utterance types and embeddings generated for each utterance group in the voice sample and then combined in a weighted form wherein the resulting embedding emphasizes selected utterance types. Similarities between embeddings for the candidate voice samples relative to the primary voice sample are evaluated and used to select a candidate speaker that is a vocal match.

29 Claims, 8 Drawing Sheets

(51) Int. Cl.
*G10L 15/00* (2013.01)
*G10L 15/16* (2006.01)

(58) Field of Classification Search
CPC ..... G10L 13/086; G10L 15/00; G10L 15/005; G10L 15/06; G10L 15/063; G10L 15/0631; G10L 15/08; G10L 15/10; G10L 15/14; G10L 15/16; G10L 15/22; G10L 15/26; G10L 17/00; G10L 17/04; G10L 17/06; G10L 17/08; G10L 17/18; G10L 17/26; G06F 40/00; G06F 40/40; G06F 40/42; G06F 40/44; G06F 40/48; G06F 40/51; G06F 40/58
See application file for complete search history.

(56) References Cited

U.S. PATENT DOCUMENTS

| | | | | |
|---|---|---|---|---|
| 2014/0236597 | A1* | 8/2014 | Ben Ezra | G10L 13/06 704/235 |
| 2016/0027431 | A1* | 1/2016 | Kurzweil | G06F 3/04842 715/203 |
| 2018/0350389 | A1* | 12/2018 | Garrido | G10L 25/48 |
| 2019/0035390 | A1 | 1/2019 | Howard et al. | |
| 2020/0074981 | A1* | 3/2020 | Chae | G10L 25/63 |
| 2020/0169591 | A1* | 5/2020 | Ingel | G10L 13/08 |
| 2020/0265829 | A1* | 8/2020 | Liu | G10L 13/033 |
| 2021/0097976 | A1* | 4/2021 | Chicote | G10L 13/10 |

OTHER PUBLICATIONS

Gresse, Adrian; Quillot, Mathias; Dufour, Richard; Labatut Vincent; Bonastre, Jean-Francois; "Similarity Metric Based on Siamese Neural Networks for Voice Casting", 2019, IEEE, IEEE International Conference on Acoustic, Speech, and Signal Processing, pp. 6585-6589 (Year: 2019).*

Obin, Nicolas; Roebel, Axel; Bachman, Gregoire; "On Automatic Voice Casting For Expressive Speech Synthesis", 2014, IEEE, IEEE International Conference on Acoustic, Speech and Signal Processing, pp. 950-954 (Year: 2014).*

Adrien Gresse, et al., Acoustic Pairing of Original and Dubbed Voices in the Context of Video Game Localization; Interspeech, https://hal.archives-ouveertes.fr/hal-01572151; Aug. 4, 2017; pp. 2839-2843; Stockholm, Sweden.

Li Deng, et al., Binary Coding of Speech Spectograms Using a Deep Auto-encoder; https://iscaconf.org; 2010; pp. 1692-1695.

David Snyder, et al., Deep Neural Network-Based Speaker Embeddings For End-To-End Speaker Verification; 2016 IEEE Spoken Language Technology Workshop (SLT), San Diego, CA, 2016, pp. 165-170, doi: 10.1109/SLT.2016.7846260.

Ehsan Variani, et al., Deep Neural Networks For Small Footprint Text-Dependent Speaker Verification; 2014 IEEE International Conference on Acoustic, Speech and Signal Processing (ICASSP); pp. 4080-4084; doi: 10.1109/ICASSP.2014.6854363.

Li Wan, et al., Generalized End-to-End Loss For Speaker Verification; 2018 IEEE International Conference on Acoustics, Speech and Signal Processing (ICASSP); doi:10.1109/icassp.2018.8462665.

Sercan O. Arik, et al., Neural Voice Cloning with a Few Samples; https://arxiv.org; arXiv: 1802.06006v3 [cs.CL]; Oct. 12, 2018; pp. 1-18.

Nicolas Obin, et al., On Automatic Voice Casting For Expressive Speech; Speaker Recognition vs. Speech Classification; 2014; pp. 1-6; 2014 IEEE International Conference on Acoustics, Speech and Signal Processing (ICASSPO); doi: 10.1109/ICASSP, 2014. 6853737; Florence, Italy.

Nicolas Obin, et al., Similarity Search of Acted Voices for Automatic Voice Casting; N. Obin and A. Roebel; Sep. 2016; pp. 1-11; IEEE/ACM Transactions on Audio, Speech, and Language Processing, vol. 24, No. 9, doi: 10.1109/TASLP.2016.2580302.

William Campbell, et al., Support vector machines using GMM supervectors for speaker verification; May 2006; pp. 308-311; IEEE Signal Processing Letters, vol. 13, No. 5, doi: 10.1109/LSP.2006. 870086.

Ye Jia, et al., Transfer Learning from Speaker Verification to Multispeaker Text-To-Speech Synthesis; Jan. 2, 2019; pp. 1-15; eprint arXir: 1806.04558v4 [cs.CL].

Yaniv Taigman, et al., VoiceLoop: Voice Fitting And Synthesis Via A Phonological Loop; Feb. 1, 2018; pp. 1-14; arXir: 1707.06588v3 [cs.L.G.].

Douglas A. Reynolds, et al., Speaker Verification Using Adapted Gaussian Mixture Models; Jan. 2000; pp. 19-41; dblp computer science bibliography Digital Signal Processing, vol. 10, Nos. 1-3.

* cited by examiner

SYSTEMS AND METHODS FOR GENERATING MULTI-LANGUAGE MEDIA CONTENT WITH AUTOMATIC SELECTION OF MATCHING VOICES

CROSS-REFERENCE TO RELATED APPLICATIONS

This application claims priority to U.S. Provisional Patent Application Ser. No. 62/987,141 filed on Mar. 9, 2020 and U.S. Provisional Patent Application Ser. No. 63/085,738 filed on Sep. 30, 2020, the entire content of each is expressly incorporated by reference.

BACKGROUND

For media companies to be successful in distributing multi-media content, such as films, games, television shows, and movies, to global audiences the media content should be properly localized for the target region. One common aspect of content localization is dubbing speech content in the media from the original source language to a different language suitable for the given region. Providing a dubbed audio track is more labor intensive compared to subtitles. However, speech dubbing provides a much higher level of immersion for foreign audiences.

An important aspect of successfully producing high quality dubbed media is selecting the voice actors used to provide the speech for dubbing into the target language. This selection process is known as voice casting. Unlike simple voice overs, which are intended to merely provide a translation, the voice actors selected to provide dubbed speech should sound like the actor whose speech they are replacing, particularly where the voice of the original actors is well known across the world. A high acoustic resemblance between the voice actors and the voices of the original actors in the source language content is desired not only so that the performance of the original characters is successfully translated but also to alleviate audio-visual dissonance that an audience may experience when watching the original cast on screen but hearing someone else's voice.

Conventionally, the voice casting process is done manually by human voice casters. The voice casters have access to a Voice Testing Kit ("VTK") for the source language as well as a target language that includes voice clips and may also include additional details about the content to be dubbed that can be referenced by the voice caster. The source language VTK contains audio samples for each character in a specific original language media content. The audio samples provided for each character are relatively brief, typically around 60 seconds each, and typically comprise for each character a few different short dialogs by the actor performing that character. Target language VTKs are conventionally provided for each character and each character-specific VTK comprises audio samples from multiple voice over artists auditioning to provide voicing for dubbing the media into the target language that character. The audio samples are generally performances of the same dialogs for the character as in the source language VTK but in the foreign language. Expert voice casters listen to the various voice clips for a given character from the original VTK and the target language VTK for that character and then select the dubbing voice actor whose voice they subjectively believe sounds most similar to the character in the source language media content they are to dub.

In general, there is a lack of well-defined vocabulary for describing voices as well as a lack of objective metrics to measure voice similarity to guide such a voice casting process. As a result, it can be difficult to quantify the voice casting selection process or accuracy of the selections. In addition, since human hearing is subjective and different humans hear differently, the limited number of people involved in voice casting may not be able to identify regional voice actors whose voices very closely match the native language voice. Two voice casters may select different voiceover artists to dub the same actor without being able to fully explain why they chose one voiceover artist over another.

In addition, VTKs that are conventionally available are limited in scope. While several audio samples can be provided for a given character, the samples by necessity need to be intelligible to the human voice caster and so contain at least full phrases and sentences. Due to time and other constraints on the voice caster, only a small number of voice clips are made available in the VTKs for the voice casting. It may be difficult and/or time consuming to obtain additional voice samples if the voice caster is undecided about which voice actor to pick and so a voice caster may simply make a selection based on the data available.

Voice casting can be laborious and subjective. There is a need for an automated voice casting system that can select for a given character in a primary language media a voice actor that sounds the same as but in a target language, wherein the selected voice actor can be used to provide dubbing content for localizing that media.

There is a further need for such a system that can provide measurable and repeatable metrics for comparing the similarities of various candidate voice actors when selecting one that sounds closest to the target providing speech in a target language to provide dubbing content in a target language.

It would be a further advantage to have such a system that can adjust and reformulate voice recording inputs to provide voice samples that meet specified criteria for utterance type content, and automatically obtaining additional recordings as needed for use in the selection process.

SUMMARY

These and other issues problems are solved by a method and system as disclosed where which performs automated voice casting by quantifying perceptual voice similarity between voices in different languages and provides objectivity and repeatability in the generation of localized media content. An input voice recording is analyzed to identify various utterances and associated utterance types, such as by pitch, emotion, catch phrase, etc. Utterances can be considered at various scales, such as phrases, words, and phonemes.

Voice samples are constructed from the identified utterances.

A trained deep learning neural network processes the voice samples to generate corresponding multi-dimensional encodings representative of the characteristics of the voice samples. A database including some or all of the identified utterances and utterance types, generated voice samples, and associated embeddings can be built for later access.

The voice samples constructed for input to the neural network are not limited by the requirement that they be suitable for use or readily understandable by a human voice caster. Instead, the voice samples can be, for example, many short segments selected from one or more input sources and merged into one or more voice samples based on utterance types. Additional voice recordings or previously extracted utterances for a speaker can be automatically obtained if the input sample is lacking in a required utterance type. Access to the voice samples (and/or the source audio samples from which the voice samples are derived, such as VTKs and supplemental media, if the voice samples themselves are not readily understandable) will allow the decisions of the present system to be traceable.

Embedding for voice samples for candidate voice actors in the target language are compared to embeddings for corresponding voice samples for the primary speaker and a similarity score for each candidate is generated. One or more candidate voice actors are identified by the system based on the similarity scores.

Where multiple embeddings are available for a given speaker, the embeddings can be combined to produce a single combined embedding that can be used in similarity score generation. Embeddings can be combined in a weighted manner to adjust the importance given to each embedding in the similarity scoring. Where the embeddings are for voice samples that reflect specific utterance types, the weighted combination of embeddings results allows for generation of a combined weighted embedding that emphasizes certain utterance types over others and this emphasis will then carry over to the similarity scoring. Alternatively, multiple embeddings for a speaker can be compared to corresponding embeddings for another speaker to generate similarity values that reflect the utterance types in the voice samples used to generate the embeddings. The similarity values can then be combined, including in a weighted manner, to produce the similarity score.

If no candidate voice actor in the initial set of candidates meets the selection criteria, the system can automatically rerun the search using a second set of candidate actors. In the event that multiple candidate voice actors meet the selection criteria, the candidates can be prioritized based on similarity scores for specific utterance types. Additional voice samples for the candidates can also be retrieved and compared to the primary voice samples to generate additional similarity score data. If no such voice samples are available, they can be automatically generated or obtained by the system.

After a particular voice actor is selected, that actor can be used to provide the voicing in the target language for the media at issue. This voicing is then used to generate the localized version of the media at issue.

The disclosed system and method is more efficient than conventional manual processes and provides quantifiable results. Generation of voice samples by combining utterances based on utterance type is a technical improvement to voice analysis systems that analyze as-spoken voice samples for, e.g., speaker identification. The present voice sample generation process can be used to ensure that the voice samples used in automatic voice casting contain an appropriately balanced set of utterances of different types and allows for weighting of different types of utterances as part of the voice casting process.

Generated embeddings can be stored in a database so that the audio processing can be done in advance, reducing computational needs for the actual automated voice casting processes. Voice samples can be generated automatically from a multitude of sources. The samples used are not limited to audio clips that are reviewable by a human voice caster but instead, for example, many short segments can be automatically selected from a relatively extended audio sample and merged into a combined sample clip used for embedding generation. Different clips can reflect different vocal aspects, such high and low pitch articulations, as well as more conventional utterances such as catch phrases.

Voice samples can be generated automatically from existing media, allowing the system to be used to identify potential voice over actor candidates across a broad spectrum of sources without requiring an audition and placement in an official VTK. When an existing set of primary and/or target language audio clips is insufficient to find a match meeting a specified match threshold, additional clips can be accessed. In one embodiment, target language voice samples (or pre-generated feature vectors) from a primary set of samples and a secondary set of samples can be accessed if needed. The secondary samples may be from the same or different voice actors than the first.

DETAILED DESCRIPTION

Figure 1:
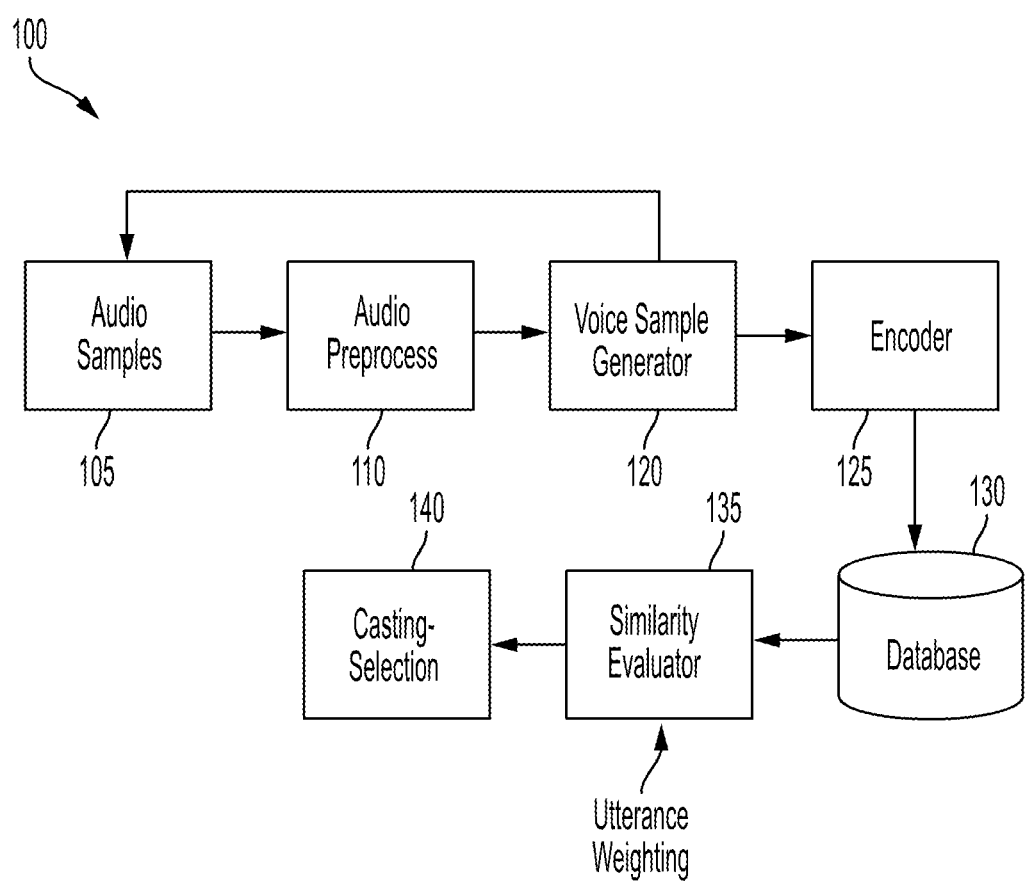
FIG. 1 is a high level process diagram for identifying speakers of a foreign language that sound most similar to a source speaker according to an embodiment.

FIG. 1 is a high level process diagram of a system 100 and method for identifying speakers of a target language that sound most similar to a source speaker in a primary language. As disclosed herein, the system 100 processes voices samples and performs automatic voice casting. In a particular embodiment given a voice sample of a first or primary speaker in a first or primary language and voice samples from multiple candidate voice actors speaking in a second or target language, the system automatically processes the voice samples and selects the candidate voice actor that best meets specified criteria for speaking resemblance to the first speaker. This system can be used as part of creating for first media in the source language a localized version of that media in a different target language. Other uses of system 100 are also possible.

A set of audio samples is provided as input to the system 100. These samples may be available in a media file database or repository 105 in a ready to use form or the samples may require preprocessing. For example, audio samples may be in the form of prerecorded utterances of short duration (e.g., less than 60 seconds or less than 30 seconds) contained in conventional voice testing kits (VTKs) for the characters in the media in the primary language and of various voice actor candidates for each character in the target language. Audio samples for a designated person can be extracted from existing longer media. This can be useful when no samples are otherwise available or when samples are provided, such as part of a VTK, but are determined to be insufficient for the system to make select a matching voice that meets specified criteria. Audio samples for the primary speaker can be extracted from the specific media that is to be localized if such media is available. Otherwise audio samples for the primary speaker and for candidate speakers can be extracted from different media.

The media from which audio samples are extracted can be selected by a variety ways. For example, a database of movies, television shows, and other media can be searched to identify media featuring the speaker of interest. The search can be limited to media in a similar genre or style as the media to be dubbed since a voice actor may speak differently in, e.g., a historic drama as compared with a comedy. Once suitable media is identified, sections of the media containing the audio sample of interest can be extracted either automatically, manually, or in a combination using software assisted selection. Alternatively, audio samples can be captured during a live audio session in which the speaker can be asked to read or say various words and phrases and the additional audio samples stored in the audio sample repository 105.

After audio samples are selected, they may need to be preprocessed which task can be accomplished by use of audio preprocessor 110. The preprocessing applied, if any, depends on the nature of the audio sample. Format conversion, such as to a lossless media format, can be performed. Silences can be trimmed. Background noise or sound effects may need to be removed.

The preprocessed audio is input to a voice sample generator 120. The voice sample generator processes the input audio samples to extract various utterances and identify the utterance types. The utterances can then be combined based on determined utterance types to produce voice samples for processing by the encoder 125. The utterances, utterance types, and generated voice samples can also be stored in a database 130 to allow for subsequent retrieval and use. Advantageously, and as discussed further below, the voice sample generator 120 can operate to generate one or more voice samples for a given speaker comprising sequences of utterances selected to provide improved and more flexible voice comparisons without regard for whether the samples would be usable or even understandable by a human in a manual comparison.

Encoder 125 is a trained neural network which generates an embedding, a form of multi-dimensional feature vector, for a given input voice sample. The embedding for each voice sample for each speaker can be stored in database 130. While a single database 130 is shown for storing utterances and embeddings, multiple separate databases could be used.

After embeddings for the voice samples from the primary speaker and voice samples for the candidate target language speakers are generated, the embeddings are analyzed by a similarity evaluator 135 to generate one or more similarity scores for each candidate relative to the primary speaker. Casting selector 140 analyzes the similarity scores to identify the candidate that best matches the primary speaker.

Where multiple embeddings are available for a given speaker, such as derived from different voice samples having different utterance types, the similarity evaluator 135 can combine those embeddings to produce a single combined embedding. The combined embedding for the primary and a given candidate speaker is then used to generate the similarity score. Alternatively, embeddings for the primary speaker and a given candidate speaker, such as embeddings generated from voice samples having the same utterance type profile, can be compared to generate multiple similarity values which can then be combined to produce the final similarity score. Where multiple embeddings and/or multiple similarity values are combined, the combination can be done in a weighted manner to increase the importance of particular utterance types in the selection process.

If no match meets predefined criteria, such as a minimum match threshold, additional voice samples for the candidate speakers or for other speakers may be obtained and processed in an effort to identify a suitable matching voice actor. Such additional voice samples may already be present in the database or generated from additional audio samples which can be retrieved for this purpose. The system then outputs an indication of the matching candidate.

After a given voice actor candidate has been selected, that individual can be approached to provide the target language dubbing content for the designated character. This content can then be used to produce the localized media.

Figure 2:
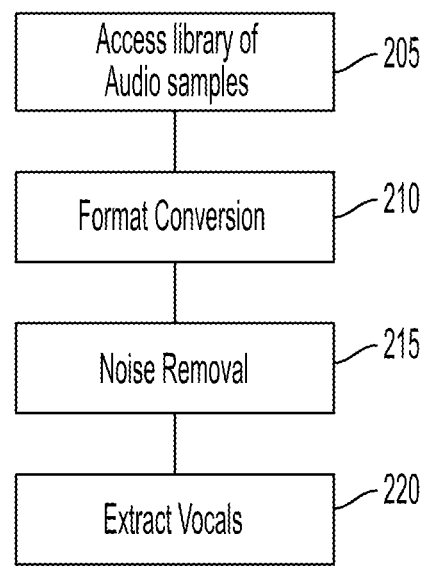
FIG. 2 is a flow chart illustrating the functionality of the audio preprocessor as in FIG. 1.

FIG. 2 is a simplified flow chart of operations that can be performed by audio preprocessor 110. In step 205, the desired library of audio samples is accessed. In an embodiment this could be the directory for designated VTKs with audio samples for a given character in the primary language and audio samples for a set of candidate voice actors to be considered for that character in the target language. In other embodiments, audio samples for a given set of voice actors may be collected from various disparate sources as discussed further herein.

The audio sample (which could be an audio only file or a multi-media file that includes audio and video) is then converted into an appropriate format. (Step 210). For example, if the audio sample is part of a multimedia video in .MOV format, the audio track can be extracted and converted into a .WAV format. The particular format is not critical but a lossless audio format avoids degradation of the audio signal.

Audio samples often include sound effects and background noise. In step 215, such extraneous non-verbal noise is removed. The desired vocals for the speaker of interest are then extracted (step 220). Various methods for isolating audio for a given speaker from existing media, such as speaker diarization and deep learning recognition algorithms, are known to those of ordinary skill in the art and can be employed for this purpose.

Figure 3:
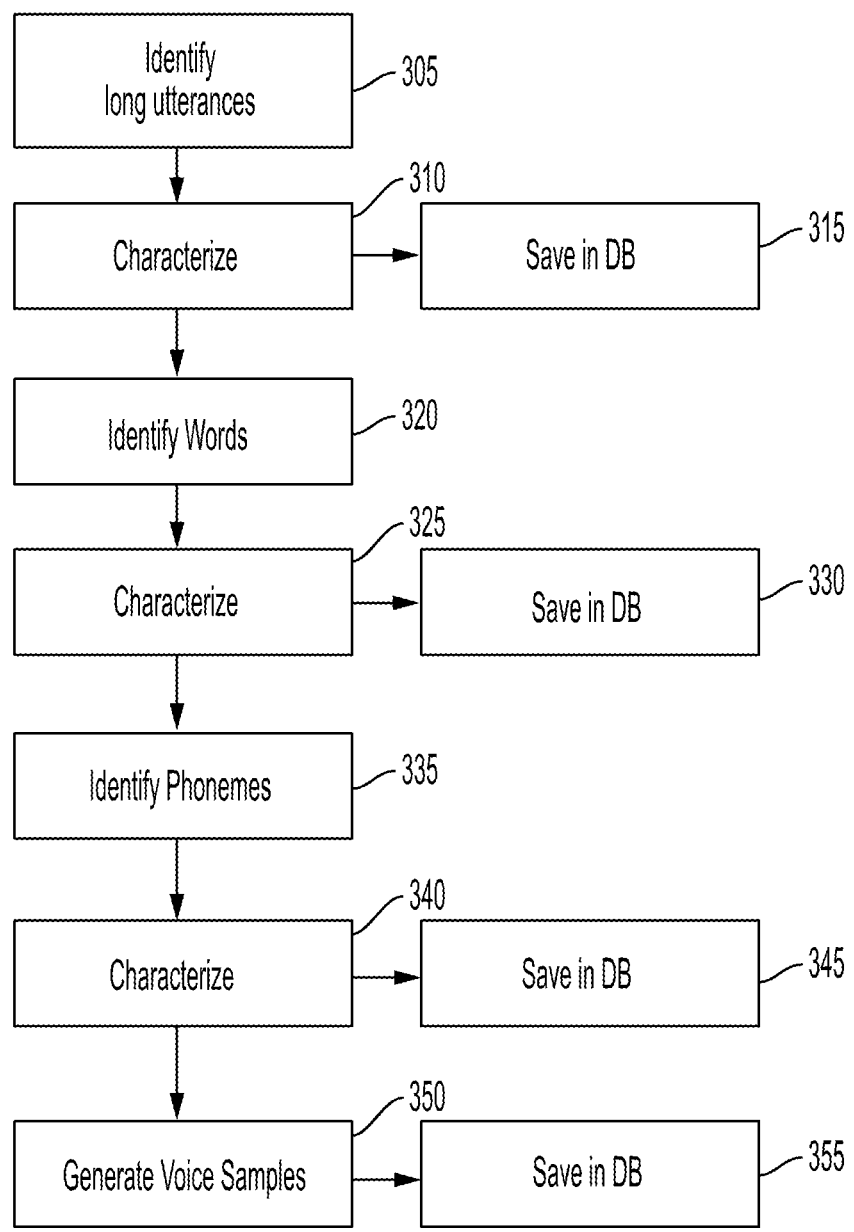
FIG. 3 is a flow chart illustrating the functionality of the voice sample generator as in FIG. 1.

FIG. 3 is a flowchart of a process that can be used by the voice sample generator 120 to parse utterances at different scales using a parsing engine, classify the parsed utterances using an audio classifier, and then generate voice samples. The voice sample generator 120 analyzes input audio samples to divide the speech into a series of utterances which can be stored and combined to create voice samples to be processed by the encoder 125. A variety of different utterances can be extracted from the initial audio samples and classified based on a specific attribute, such as emotion, pitch, phrase, etc.

Examples of different types of utterances include high pitch and low pitch utterances. High and low pitch can be defined in a variety of ways. In one embodiment, high and low utterance types of an average utterance pitch that is above or below a predefined high or low pitch threshold. In another embodiment, the high and low pitch can be defined in a relative format as being utterances with an average pitch a specified amount above or below the normal pitch of a given speaker, such as the actual speaker's own average speaking pitch or with reference to high and low pitch thresholds for the primary speaker to the candidate speakers are compared. Other utterance types include excited utterances and catch phrases important in the media being dubbed or for which the speaker to be matched is known. Non-lexical utterances, such as "um", "uh-huh" and "hmm"

can also be extracted. Utterances can be extracted a different verbal scales, such as phrases, words, and portions of words like syllables and phonemes.

Various audio mining and similar technologies known to those of ordinary skill in the art can be used to extract utterances from an audio stream. Conventional audio tool kits and processing engines used in voice-to-text dictation systems are available that can generate a text stream with words and phrases mapped to corresponding portions of an audio clip. Various machine-learning and other speech-to-text API's are also available from commercial vendors, such as Google, Microsoft, and IBM. Existing systems for parsing words into phonemes and for audio classification (e.g., of phonemes, words, and phrases) of utterance sentiment and other types are also known to those of ordinary skill in the art and can be used for such purposes. Various currently available technologies employ trained deep neural networks. In an embodiment, classification is done entirely automatically. However, the process can be supplemented by manual classification.

Turning to FIG. 3, in step 305 the input audio sample is parsed to identify long utterances, such as words and phrases. The identified utterances are characterized to identify one or more designated utterance types using an audio classifier. As noted, various types of characteristics can be identified for a given utterance, such as related to absolute or relative pitch, whether the utterance is a designated catch phrase, and features related to tone and sentiment or emotion. The analyzed utterances can then be saved in a database, such as database 130, along with the characterization(s) of the utterance and other data, such as an identity of the speaker and the source of the utterance. The utterances can be saved as independent sound clips or as links to a stored copy of the input audio sample along with meta data, such as start and end time stamps, specifying where in the audio sample the particular utterance is. Other methods of storing and allowing subsequent access to utterances and determined utterance types can also be used.

In steps 320, 325, and 330, the audio sample is processed to identify shorter utterances, such as discrete words, and to classify those according to utterance types. In an embodiment, instead of reprocessing the audio sample as input, the long utterances identified in step 305 can each be processed. The determined utterance type of the parent utterance can be inherited by this shorter utterance. In addition, or alternatively, a further utterance type can determined. For example, a longer utterance could be characterized as both an excited utterance and a catch phrase while one of the word utterances extracted from that phrase is characterized as a high-pitch type utterance. The identified utterance and determined utterance type information is stored in the database 130. Additional information can also be stored, such as a link to the longer utterance from which it was derived.

The audio sample, long utterances, or word utterances can be further processed to generate syllable or phoneme utterances which can be likewise characterized and/or also inherit the utterance type of their parent(s). The extracted syllable or phonemes and utterance types are stored in the database. (Steps 335, 340, 345). While three levels of utterance granularity is illustrated more or fewer levels can be used. The utterance classification types used can be different for different utterance scales. For example, long utterances may be classified relative to a first set of utterance types while shorter utterances, such as words, or phonemes/syllables can be classified relative to respective second and third sets of utterance types. There may be full, partial, or no overlap between the utterance types available at different utterance scales.

A simple audio sample from a typical VTK with several phrases spoken by a given character might be: "This place is falling apart . . . What's that smell? . . . . OW! That's it! . . . Hmmmm, that was impressive . . . Excellent!". In steps 305 and 310, the long utterances (which in this example are shown separated by ellipses) are identified and characterized. The utterance "OW! That's it!" may be classified as an excited utterance while the utterance "Hmmmm, that was impressive" classified as a low pitch utterance, and the utterance "Excellent!" classified as a catch phrase. In steps 320 and 325 each of these utterances can be further processed as appropriate to extract word utterances and non-lexical utterances. As will be appreciated, the same word can be present multiple times in the audio sample but have different utterance types, such as the word "that" in the present example. In steps 335 and 340 the word utterances are broken down as appropriate into phonemes or syllable utterances. In the example, there are four 'voiced th' phonemes (/ð/) that could be extracted as different utterances, each having its own utterance type (independently determined, inherited from its parent, or a combination).

After the utterances in the audio sample have been identified and characterized, the utterances can be combined to produce one or more voice samples for that speaker. Temporally this can occur immediately after processing of the audio sample or a library of classified utterances can be generated and the utterances accessed at a later date in voice sample generation. Voice samples for the primary speaker and the candidate speakers are generated such that the voice sample meets at least one utterance type criterion. (As used herein, unless specified otherwise, criteria should be considered as encompassing both one and multiple criteria.) The criteria used in generation of voice samples for the primary speaker and the candidate speakers will typically be the same; however, different criteria(n) could be used for the primary speaker as compared to that for the candidate speakers.

Utterances can be combined in a variety of different ways to generate voice samples for comparison analysis. Creation of voice samples by deconstructing and recombining portions of audio samples according to utterance type as disclosed herein provides a technical improvement over conventional voice analysis systems that process audio clips of normal speech with utterances remaining in the order spoken. Because the generated voice sample is not intended to be understandable by a human listener, such as a voice casting expert, the generated voice sample does not need to be intelligible to a human. Instead one or multiple voice samples can be generated in order to increase the accuracy of the automated voice casting comparison. Identification of utterances can also provide increased flexibility in the voice matching process, such as by allowing adjustable weighting to be applied to emphasize one utterance type similarity over another.

In an embodiment, the utterance types of the input audio sample are considered to determine if the sample has an utterance type distribution that meets one or more predefined criteria. Some utterance types may be required to the present while others are options. If a required utterance type is not present, or sufficient examples of a given utterance type are not present, the database 130 can be accessed to determine whether utterances from the same speaker of the desired utterance type are available, such as from the processing of a prior audio sample. If a sample of the missing utterance type is not available, additional audio samples for that speaker may be obtained and analyzed as discussed further herein. If this option is not available, an indication of the missing utterance type can be given to the operator and they can take appropriate steps to obtain a suitable additional audio sample.

In an embodiment, the generated voice sample comprises the input audio sample with additional utterances added as required to ensure that the voice sample meets predefined criteria such as utterance type distribution requirements. For example, a voice sample may be required to have certain utterance types and a specified minimum and/or maximum number each such utterance types (which min/max can vary based on type). Voice sample criteria can be different for different speakers, such as a primary speaker and candidate speakers, and vary among different characters. Metadata can be added to the voice sample to identify where each utterance in the voice sample is located and the corresponding utterance type. Silences between utterances can be shortened or eliminated as understandability of the voice samples is not a requirement. In an alternative embodiment, the various utterances are combined to build a single voice sample but with utterances sorted so that utterances of the same type are provided sequentially to each other in the voice sample. The order can be predefined. If an utterance type is specified in the predefined order but is not present in the utterances available for the speaker at issue a blank or null sample can be inserted at that point.

Each voice sample is preferably less than a total time duration t. For example, a 't' second voice sample can include 't1' seconds of normal speech utterance, 't2' seconds of low pitch utterance, 't3' seconds of high pitch utterance, 't4' seconds of excited utterance and 't5' seconds of catch phrases. While time duration t could be any length, the maximum duration t of the voice sample can be selected with reference to the maximum length voice sample that can be efficiently be processed by the encoder 125. For an encoder 125 configured as disclosed herein, t can be less than 1 minute. Where a voice sample with different utterance types is processed as a whole, the time durations of the sub-samples 't1', 't2', 't3', 't4', and 't5' can have a combined length of less than t.

Alternatively, multiple voice samples can be generated, each containing utterances for one or some of the available utterance types. As an example, one voice sample could contain only normal utterances, a second only low pitch type utterances, a third voice sample only high pitch utterances, a fourth only excited utterances, and a fifth only catch phrase utterances. If separate voice samples are generated for different utterance types, each separate voice sample can have a duration less than t even if the combined length of voice samples is greater than t.

Where a single utterance in a sample has multiple types, that utterance could be included in the voice sample generated for each utterance type. Alternatively utterance types could be given relative priorities for voice sample generation and a multi-type utterance included in the voice sample for the highest priority utterance type. As a variation, a multi-type utterance can be included in a voice sample for the highest priority utterance type but also lower priority types if no other utterance of that lower priority type is available.

Multiple voice samples can be provided at different levels of utterance granularity. In an embodiment, one voice sample could be the initial audio sample as a whole and additional voice samples generated for different utterance levels (e.g., for phrase, word, and syllable/phoneme utterances) and/or different utterance types. For example, a generated voice sample can include all high-pitch utterances at a given utterance level in sequence (with or without any intervening dead space) followed by low-pitch utterances in sequence, then excited utterances, etc. In another example, one voice sample can contain the excited utterance types extracted at the long utterance level (step 305), a second voice sample can contain some or all of the non-lexical utterances as extracted at step 320 while a third and fourth voice sample contains respectively all or selected high pitch and low pitch utterances extracted at step 335.

As noted, in some embodiments, specific utterance types may be mandatory for a voice sample. If no appropriate utterance is present in the input audio sample or otherwise present in database 130, the system can indicate that additional voice samples from the speaker are required. This indication can trigger the system 100 to obtain and process additional audio samples from that speaker. These additional voice samples can be obtained from existing VTK samples intended for use in localizing different media or can be extracted from other media available in a media library, such as a library of movies, TV shows, commercials.

In addition or alternatively, a message can be generated and sent to the speaker or a designated representative requesting an appropriate audio sample. In an embodiment, the system 100 can be configured to send such a message to the respective speaker, e.g. via e-mail, text, or other mechanism, requesting the further audio sample. The message could include a script from which the speaker should read and instructions related to providing the voice sample. The designated speaker can then record the sample using appropriate equipment and then return it to the system 100.

In one embodiment, it may be sufficient for the speaker to simply record the sample on their cell phone after which the recording is returned to system 100. A smart phone App with recording capability can be provided to interface with system 100 and provide instructions to the speaker and capture and return the audio sample to the system 100 for such purposes. Alternatively, the desired audio sample could be captured by during a live audio session, such as a telephonic, VOIP, or video link established with the speaker, which link can be established automatically by system 100 or manually, e.g., by a system operator.

The one or more generated voice samples are subsequently input to the encoder 125 which generates corresponding embeddings. In an embodiment, encoder 125 comprises a deep learning neural network that has been trained using voice samples to produce a multi-dimensional embedding, such as a 256-dimension embedding, which can be used as a feature vector for use in comparing to feature vectors of other speakers as discussed herein. Neural networks designed for use in speaker identity verification are well suited for use in a system 100 as disclosed herein. The use of the trained network also allows for processing of voice samples that are not well suited for manual comparison by a human expert and may in fact be unintelligible to a person.

In a more particular embodiment, the encoder 125 is a deep learning network that can learn embeddings for unseen speakers during training (zero-shot learning) and also learn embeddings from a small duration of audio (typically under 60 seconds for dubbing VTKs). Embedding networks trained using generalized end to end loss are computationally efficient during training and produce low error rates. These networks have been used effectively in text-independent speaker verification tasks, and are known to generalize well with other tasks such as transfer learning for speech synthesis. They are also good at zero shot adaptation for new speakers. Advantageously, embeddings can be inferenced from just a few seconds of audio samples from speakers outside the training set.

Figure 4:
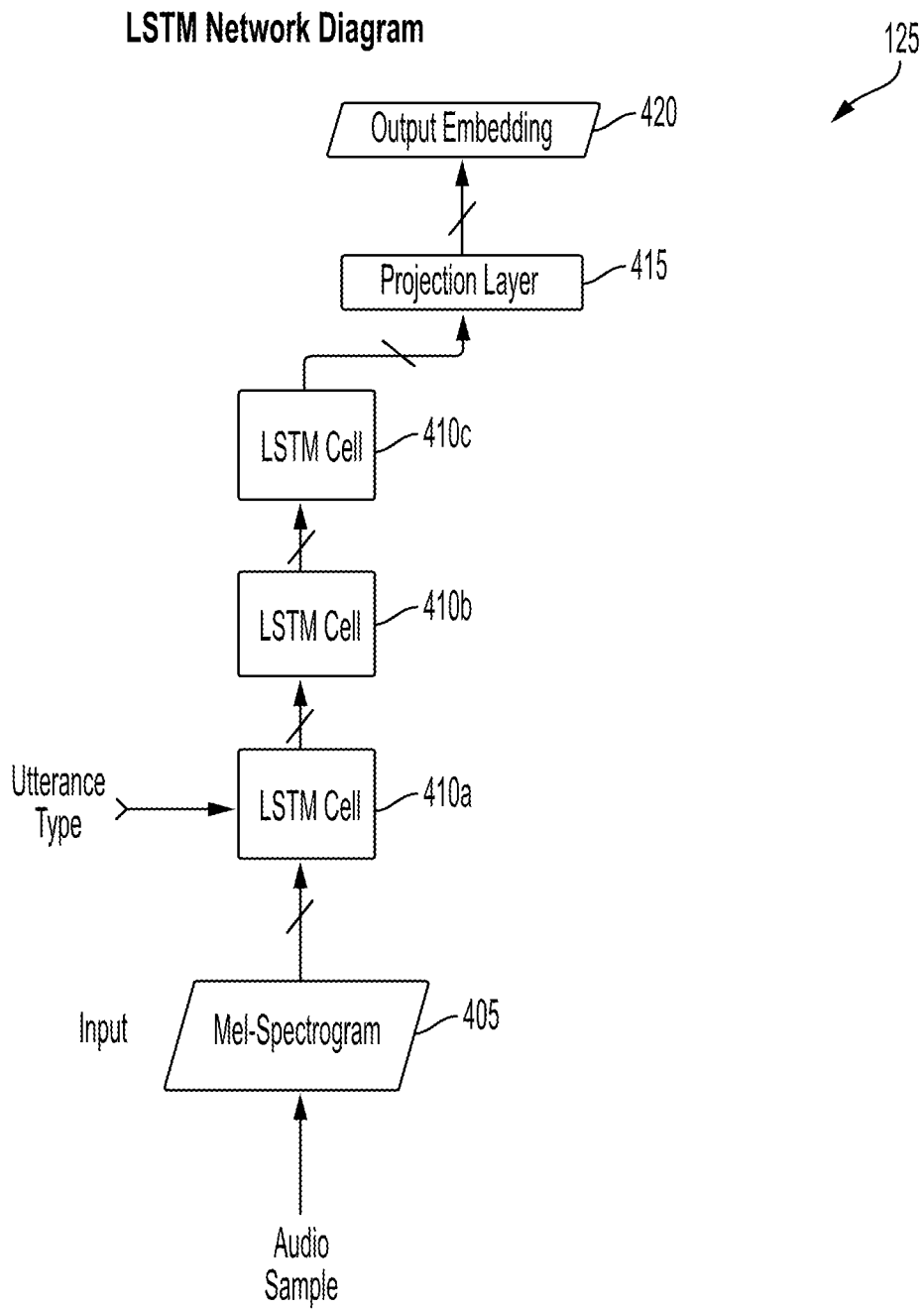
FIG. 4 is a block diagram of a deep learning neural network portion of the encoder as in FIG. 1.

In a particular embodiment, the encoder 125 used to generate embeddings is a 3-layer LSTM (Long Short Term Memory) architecture with 768 hidden nodes followed by a projection layer of 256 units. A simplified diagram of this architecture is shown in FIG. 4. The audio sample is processed with a Mel Spectrogram generator 405, such as one that produces 40-channels log-mel spectrograms with a 25 ms window width and a 10 ms step. The spectrogram is then input to the LSTM and data propagates through LSTM layers 410a, 410b, 410c in sequence.

The output of the last LSTM 410c is fed to projection layer 415 from which the output embedding 420 is obtained. A particular implementation of a network of this type, used for text-to-speech applications with output in the voice of different speakers, is disclosed in Jia, Y., et al., "*Transfer Learning from Speaker Verification to Multispeaker Text-To-Speech Synthesis*", Advances in Neural Information Processing Systems 31 (2018), 4485-4495.

The neural network in encoder 125 can be trained with a speaker verification task using generalized end-to-end loss. The inputs to the model can be the same as in encoder 125, which in an embodiment is 40-channels log-mel spectrograms with a 25 ms window width and a 10 ms step. Speech training data can be obtained from various sources, including open datasets such as LibriSpeech-Other, VoxCeleb1, and VoxCeleb2. Audio samples from these datasets can be processed using the voice sample generator 120 in order to produce voice samples for training of a similar format to that used by system 100.

In an embodiment, the utterance type for an input audio sample can also be input to the network 125, such as an input to cell 410a. (See FIG. 4). If this is done, the utterance type indication should also be used as input while training the network. Alternatively, the utterance type data can be used primarily for generation of voice samples and for comparison weighting as discussed further below.

Figure 5A:
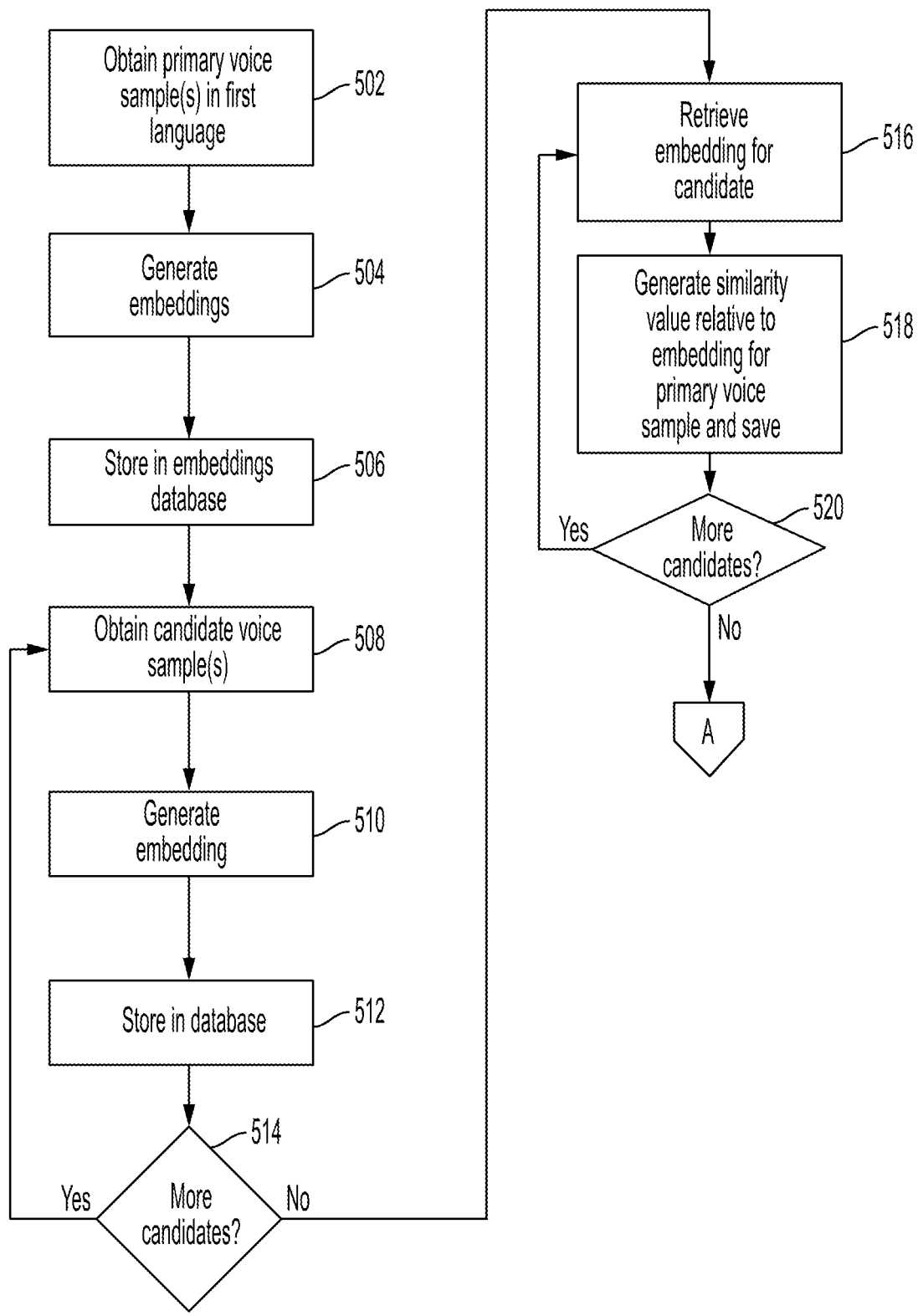
FIG. 5a is a flow chart illustrating the functionality of the similarity evaluator as in FIG. 1.
Figure 5B:
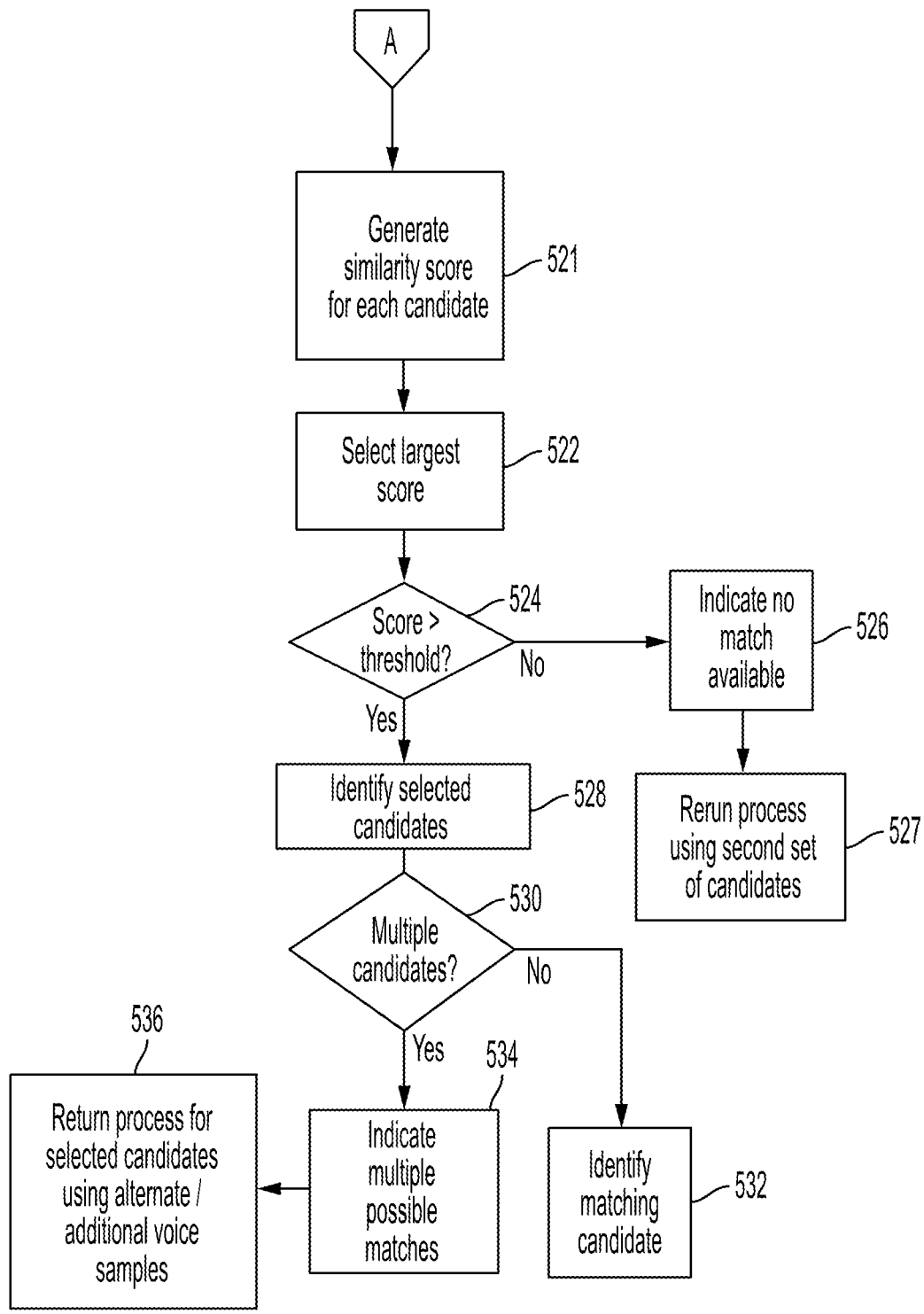
FIG. 5b is a flow chart illustrating the functionality of the casting selector as in FIG. 1.

FIG. 5a is a flow chart illustrating the functionality of the similarity evaluator 135 that uses the encoder 125 to generate embeddings then generates similarity scores for candidate voice actor voice samples relative to corresponding voice samples of the primary speaker. FIG. 5b is a high level flow chart illustrating functionality of the casting selector 140 to select an appropriate candidate voice actor.

Turning to FIG. 5a, in step 502, the voice sample(s) for the primary voice in the primary language are obtained. These voice samples can be ones which were generated by the voice sample generator 120 and stored in database 130. The voice sample(s) are input to the encoder 125 (step 504) and the embedding generated by encoder 125 for each such voice sample is stored, such as in in the database 130 (step 506). Voice samples are also obtained each of the candidate voice actors who are being considered to provide voice content in the second language. These samples are also input to the encoder 125 and the associated embeddings generated by encoder 125 stored, such as in database 130. (Steps 508, 510, 512, 514).

The embeddings for each candidate can then be evaluated relative to the embedding of the voice sample for primary speaker using a similarity function to determine a numerical similarity value that can then be stored. (Steps 516, 518, 520). A suitable similarity function is a cosine similarity function. The cosine similarity function can be obtained by taking a product of the multidimensional embedding data for the two voice samples being compared. The magnitude of the cosine similarity function indicates how closely the voice of the candidate speaker's matches the voice of the primary speaker for the given type of voice sample.

If only a single voice sample is available for a given speaker, there will be only one embedding against which similarity can be assessed. If multiple voice samples are available, such as when each sample has a different utterance type or set of utterance types, multiple embeddings can be generated for a given speaker. In a multiple embeddings situation, similarity can be assessed by combining the embeddings to produce a single combined embedding to use for similarity evaluation and generation of the similarity score. Alternatively, a similarity value can be generated for each of the multiple embeddings and the similarity values combined to produce a single similarity score.

In an embodiment where the multiple embeddings are combined to produce a single combined embedding used for similarity evaluation, each embedding can be given the same weight in the combination. Alternatively, the weight given to an embedding can be based on the utterance profile for the corresponding voice sample. In a particular embodiment, utterances are averaged, which averaging can be a weighted average where a larger weight is given to the embedding (s) corresponding to voice samples containing utterances to be emphasized in the subsequent similarity assessment. The weightings can be the same or different for the two speakers. For example, one weighting can be applied to embeddings for voice samples from the primary speaker while a different weighting is applied to embeddings for voice samples from candidate speakers.

For example, if embeddings are available for n different voice sample types for each speaker, a simple weighted combination of embeddings can be a sum of each embedding $E(n)$ multiplied by its corresponding weighting $W(n)$ and the total sum divided by n. If the voice casting is intended to emphasize a certain characteristic, the weighting applied to the utterance type(s) associated with that characteristic can be increased. For example, if a voice over artist is desired that is not only similar in the neutral tone but also the most similar when saying a certain catch phrase or conveying a certain emotion, the weighting applied to embeddings associated with those types of utterances for the candidates can be increased.

In embodiments where only a single voice sample is provided but weighting is still desired, metadata indicating the position within the voice sample of the various utterances and the utterance types can be used to break the voice sample into parts, with each part corresponding to one or a group of utterance types that is assigned a weighting. Each part can then be input separately to the encoder 125 to generate corresponding embeddings. If weighting is not desired, the voice sample can be input to the encoder 125 and processed in its entirety.

In an alternative embodiment, instead of combining multiple embeddings to produce a single embedding used for similarity evaluation, each discrete embedding for a given voice sample can be used to generate a similarity value relative to embeddings for corresponding voice samples from the other speaker. The multiple similarity values can then be combined, such as by a weighted average, to produce the similarity score, where the weighting is selected according to the types of utterances to emphasize in the comparison.

While utterance criteria are not required to be the same for the primary voice sample and the candidate voice samples, using the same criteria can provide some advantages, such as when the voice casting is to focus on a specific aspect or quirk of the primary speaker. Likewise, when comparing embeddings from two voice samples, a more targeted indication of voice similarity for particular utterance types can be provided by comparing voice samples that have compatible utterance type profiles. Compatibility can vary depending on the type and requirements of the voice samples. According to one measure, two voice samples are compatible when they both have an utterance type distribution that meets the same minimum predefined criteria, which criteria can vary based on the type of voice sample at issue. For a voice sample with a single utterance type a compatible sample could also contain that utterance type and could be required to have only that utterance type. Where a pair of voice samples each include multiple utterance types, compatibility can be determined if each has the same types of utterances and possibly require that there are no utterance types in one sample not present in the other. Compatibility may further require that each sample have a minimum number of a given utterance type, where the number required could be dependent on the utterance type and/or on whether the sample is a primary speaker or candidate speaker.

Turning to FIG. 5b, similarity scores are then determined and evaluated by the selection module 140 to select the candidate that best matches the first speaker. In step 521 a similarity score is generated for each candidate relative to the primary speaker if needed. If each candidate has only a single similarity value relative to the primary speaker, such as where only a single embedding for the primary speaker and respective candidate are compared, that value can be used as the similarity score. If multiple similarity values have been calculated, e.g., for multiple voice samples, the similarity values can be combined to generate a similarity score, such as on a weighted basis as discussed above.

The similarity scores for each candidate speaker relative to the primary speaker are then considered to select one or more matching candidates. In a simple implementation candidate with the highest similarity score is declared the matching candidate. Optionally, for there to be a match a similarity score must exceed a minimum threshold. If the largest score does not exceed this threshold than no suitable match is currently available and this can be indicated to a user (steps 522, 524, 526).

A no match condition could be used to automatically trigger specified remedial action or to indicate to an operator various remedial actions that are available and to receive input indicating which action to take, if any, In one embodiment, a matching process is rerun using a second set of candidates to try again to find a match (step 527). Thus voice samples for a preferred first set of candidate voice actors can be analyzed for a suitable match. If no match is found, voice samples for a second set of less preferred candidate voice actors (for example those who are more expensive or not already under contact) can be accessed and analyzed for a match.

Assuming at least one similarity score exceeds the threshold, so that at least one possible match exists, the one or more matching candidates are identified. (Step 528). The candidate having the highest score can be chosen as the best match. Alternatively, all scores exceeding a threshold can be identified as potential matches. Other conditions for selecting matching candidates could also be used, such as indicating as possible matches the highest score candidate and lower candidates within a predefined margin relative to the highest score.

If only a single candidate is matched, that candidate can be identified as the selected candidate (steps 530, 532). If multiple candidates are available this can be indicated to the user (step 234) and options for selection among the multiple candidates presented. Selection between these matches may be done externally from the system 100. For example a manual selection process can be employed to select a candidate based on other factors, such as availability and cost. Alternatively, additional or alternative voice samples can be obtained and processed for these selected candidates and the automated matching process rerun (step 536). If additional samples are not already available as generated voice samples with determined embeddings, processing by the audio preprocessor 110, voice sample generator 120, and encoder 125 can be done as appropriate. The similarity scores from this second pass can be used independently or the scoring can be combined with the scores from the first pass to try and select a single match among the multiple candidates.

Such alternative voice samples can be obtained in a manner similar to that discussed above when additional samples are needed to generate appropriate voice samples. The additional samples can be obtained from existing VTK samples, extracted from available media, or captured during a live audio session. If an alternative sample is not available the system 100 could trigger a message to be sent to the respective candidate, e.g. via e-mail, text, or other mechanism, requesting the further speaking sample. The message could include a script from which the candidate should read and other instructions related to providing the sample. A link can be included to an on-line service or an App executed to provide appropriate upload of the voice sample as. The voice sample can be an existing media file or the candidate's voice can be recorded at that time using appropriate equipment.

Once the specific candidate has been selected, a human voice caster or other party can approve of the selection as required and make appropriate arrangements for the selected candidate as part of creation of the localized media. Appropriate voicing from the selected candidate in the desired second language is obtained. The voicing can be input to a dubbing system which can add the second language speech to the media as a substitute for the first speaker. Depending on the type of program and its intended distribution format, the dubbed media can replace the original media or be provided as part of a selectable alternative language audio track.

Advantageously, the system as disclosed herein provides a technically improved system for automatic voice matching for use in identifying best sounding matches for a primary speaker in a different language. Additionally, this process provides not only a quantifiable measure of similarity between two speakers but also provides an improved system that can indicate in which ways two speakers are similar and also the ways in which they are not. Such information can be particularly valuable when trying to assess what factors a voice casting expert considers (even if unconsciously) in selecting a matching voice actor. Likewise, where two experts disagreed on the best match from a given set of candidates, the scoring based on utterance types can provide an indication of what vocal aspects each considered important and where they differ.

Figure 6:
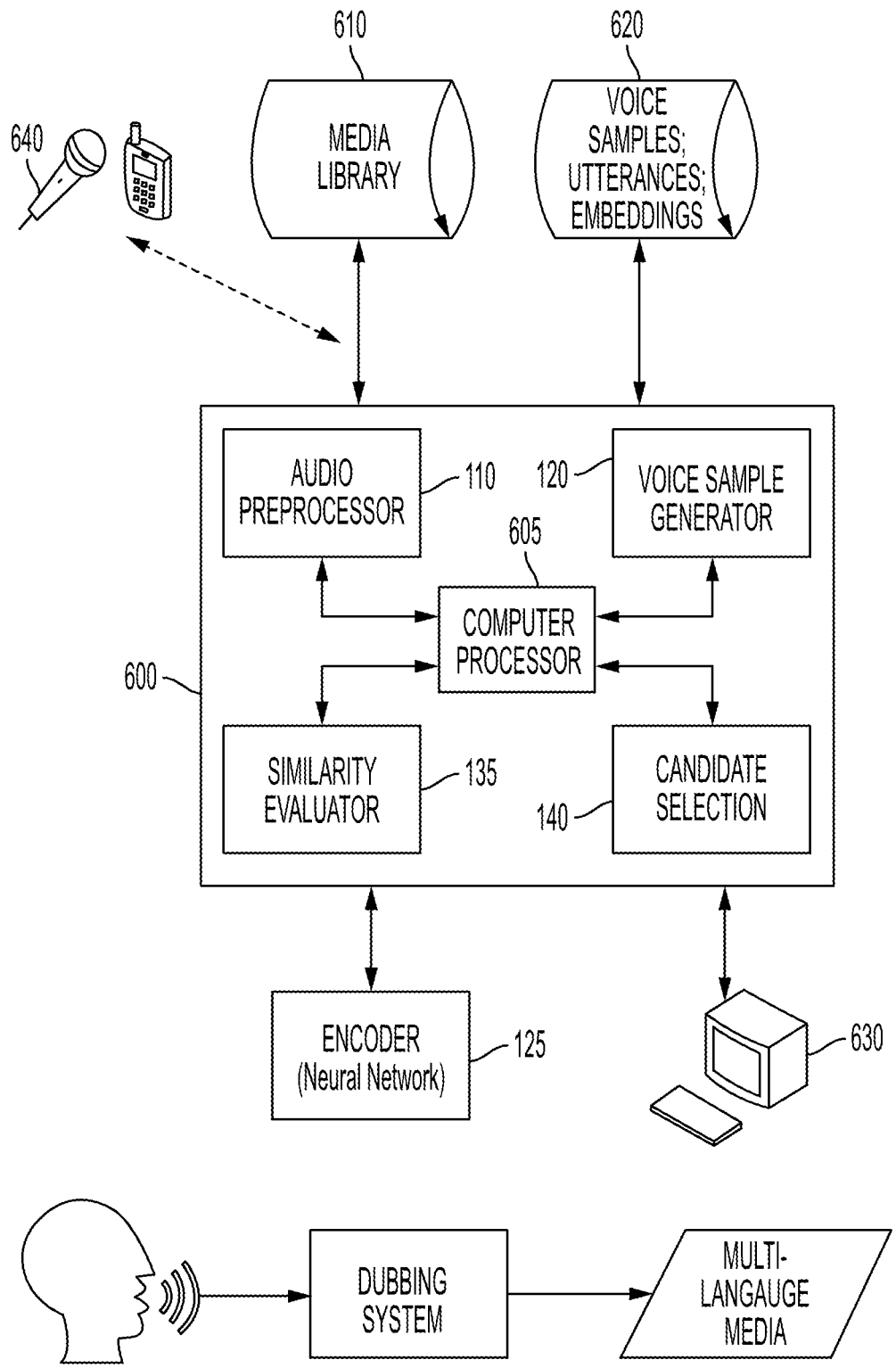
FIG. 6 is a high level diagram of a system implementation of a system for identifying speakers of a foreign language that sound most similar to a source speaker according to an embodiment.

The system 100 can be implemented using various computer-based systems. A high level diagram is shown in FIG. 6. A central computer system 600 has a computer processor 605 and computer memory that includes software to configure the system 600 to perform the various functions as disclosed herein. Some functionality, such as the audio preprocessing module 110, the voice sample generator 120, similarity evaluator 135, and candidate selection module 140 can be implemented as software processes in computer 600 with the software stored in a memory of the computer system 600 while the deep learning neural network 125 is implemented as a computing system separate from the central computer system 600 as shown in FIG. 6 and that can be optimized for neural network processing. Encoder 125 could be physically connected to computer 600, or alternatively implemented within computer 600, either in the general computer software or as part of a an internal co-processing neural network card, or accessed over a network.

Computer 600 is connected to a media library 610 which contains various audio samples and media from which they can be extracted. While a single media library 610 is shown, the library can be stored in a distributed manner in multiple separate devices including local media sources and remote sources accessible through a network. A separate database 620 is provided for storing the generated voice samples, extracted utterance data, and calculated embeddings. Database 620 could be combined with some or all of the media library 610 and can be local to or remote from the computer 600. Computer 600 also includes conventional input and output systems, such as a control terminal 630 through which system input and output can be presented to an operate allowing selection of audio samples to process, adjustment of utterance type weightings, output of selected candidates, etc. Computer 600 also includes functionality to connect to other external devices 640 to allow request for and receipt of additional audio samples when needed and not otherwise available through the media library 610.

While computer 600 is shown as a single element, it can comprise several separate devices connected together with one or multiple microprocessors. For example, the audio preprocessor may be implemented in a separate platform. Likewise, while various functionality is discussed herein as being implemented in separate modules, such as a voice sample generator 120, similarity evaluator 135, and candidate selection 140, the software in a given implementation can be combined or divided differently than discussed. For example, candidate selection and similarity evaluator could be implemented as a single software module.

Implementation of the systems as disclosed herein using a trained version of the specific 3-layer LSTM network has been found to be able to process from three to ten different audio samples of between 30 and 60 second each for different actors in the primary & secondary languages in a second. This speed is particularly advantageous when voice casting to normalize a large cast movie that can have with up to 80 character actors. There may be up to 10 foreign language voice actors who are in the consideration for each of those characters, requiring analyzing and ranking up to 800 audio samples. The automated systems and methods described herein can determine second language voice actors whose voices closely match voices of the 80 or so English language actors in less than hour.

Testing with sample VTK for four characters and candidates for four different languages also resulted in successful automated candidate selections that successfully matched selections made by test participants. The study was conducted a study using actual dubbing VTKs from a Warner Bros. television series consisting of audio samples for four characters (1 female, 3 males). The source language was American English and the target languages were Latin American Spanish, Brazilian Portuguese, Italian and Hungarian. Table 1 shows the number of voice over artists auditioning for dubbing each character:

TABLE 1

Number of voiceover artists for each language-character pair

| Language | Number of Characters | Number of Voiceover Artists per Character |
|---|---|---|
| Latin American Spanish | 4 | 3 |
| Brazilian Portuguese | 4 | 2 |
| Hungarian | 3 | 3 |
| Italian | 3 | 3 (4 for one character) |

In addition to the VTK the voice casting decisions made by casting experts were also available to use in evaluating the accuracy of the system.

There were a total of 56 participants. All participants were instructed to wear headphones for the duration of the test. In addition, frequency response tests at pre-defined volume conditions were conducted to ensure auditory fidelity of the setup as well as participants' hearing. Participants were told to record lowest and highest frequencies they were able to hear through their headphones.

Participants were asked to listen to an English language voice speaker and corresponding candidate samples for the same character in the target language. Participants could reference, pause, play both the source as well as target language audio samples at their will to help with their evaluations. The participants were then asked to then rank the candidates in order of similarity to the English language reference, rate the similarity of each candidate sample relative to the reference, and to score their own confidence in the ranking/similarity scoring. The similarity scoring followed a five-point scale: (−2) Very Dissimilar, (−1) Dissimilar, (0) Fairly Similar, (1) Similar, (2) Very Similar. Confidence levels were ranked on a similar scale: (−2) Not Confident, Very Challenging, (−1) Challenging, (0) Confident, but still Challenging, (1) Confident, (2) Very Confident.

The same VTK samples were used as input to the automated tool for evaluation. The automated tool used the source language speaker embeddings as reference embeddings and then computed the similarity scores for the target language voiceover artist per character. The highest-scoring voiceover artists were then recorded as the chosen voiceover artist for comparison with the subjective study decisions as well as the casting-expert decisions. For simplicity, only single voice sample for each character and voiceover artist was processed by the encoder and the utterance parsing and typing and voice sample construction was omitted. As such, other than some preprocessing, the audio samples processed by the trained encoder were the same as those listed to by the test subjects.

The match rate was used as the main metric to evaluate the system. Matches were considered as every language-character pair for which the automated tool predicted the same highest ranking (highest similarity score) voice over artist as the study participants did. This is an appropriate metric for the use-case of voice casting. The match rate formula was calculated as: Match Rate (%)=((Number of Matches)/(Number of Matches+Number of Non Matches))*100.

Figure 7:
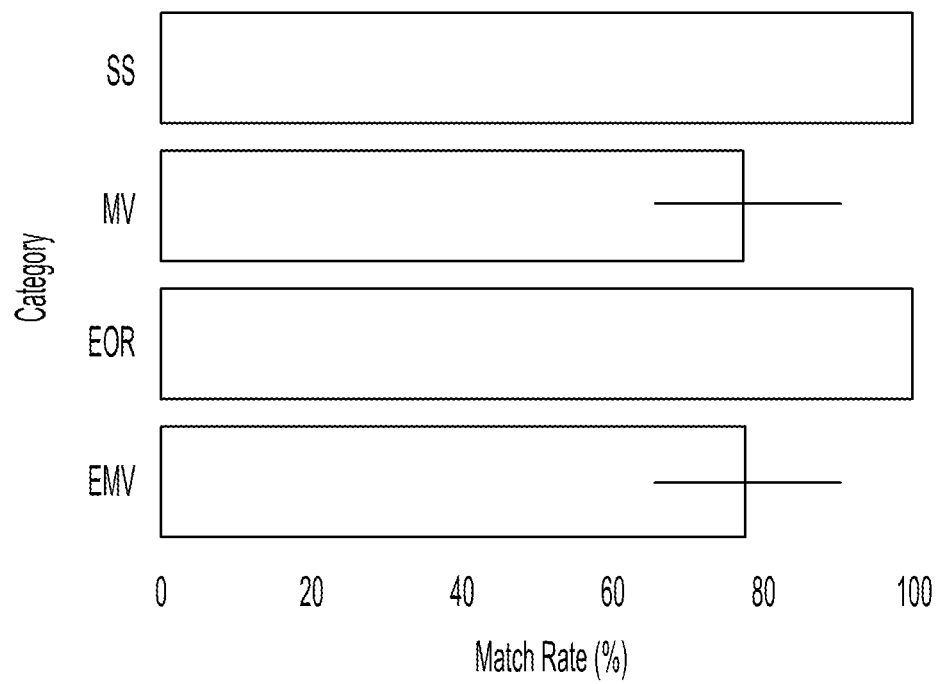
FIG. 7 is a chart illustrating match rates for an automated voice casting tool as disclosed herein relative to matching by test subjects.

FIG. 7 is a chart of the match rates obtained in this test. The test results were filtered to identify rankings that were considered statistically significant by satisfying the condition that the Margin of error is less than the difference in proportions for the top two contenders for the top-ranking voiceover artists. Using 95% confidence intervals it was found slightly less than half (43%) of the results had statistically significant rankings. (The low statistical significance rates could be attributed to either having a very competent set of voice actors used for the dubbing test and/or the subjectivity/variability in perceptual similarity between voices. The latter factor illustrates the inherent difficulty in the voice casting process and highlights the need to have an objective guiding metric, such as such as provided by the system disclosed herein.)

When considering the Statistically Significant rankings (SS) from the study, only one mismatch was observed between the expert decisions and the automated tool as well as the study rankings. Essentially a match rate of 100% was obtained, meaning that every time there was a significant consensus between participants that a voiceover artist was more acoustically similar to the original cast member than the other artists, the automated tool ranked the same artist as most similar. Including all rankings which had majority votes resulted in a 77.8% match rate between the automated tool and the expert rankings (EMV). However, when viewed in an either-or match scenario (EOR) where the subject selections and automated tool were considered to match if the automated tool matched with either the study rankings or the expert rankings or both, a 100% either-or match rate for majority vote cases was found, meaning that every time the automated tool ranking mismatched with the study rankings it matched with the expert ranking and vice-versa.

Various aspects, embodiments, and examples of the invention have been disclosed and described herein. Modifications, additions and alterations may be made by one skilled in the art without departing from the spirit and scope of the invention as defined in the appended claims

The invention claimed is:

1. A computer-implemented method for automated voice casting comprising the steps of:
accessing a primary audio sample comprising speech of a primary speaker in a primary language;
analyzing the primary audio sample to identify a plurality of primary utterances therein, each primary utterance having an associated utterance type;
generating a primary voice sample by selecting, from the plurality of primary utterances, a set of primary utterances having an utterance type distribution meeting at least one predetermined primary utterance type criterion;
accessing a plurality of candidate audio samples each comprising speech from a respective candidate speaker in a target language different from the primary language;
identifying, in each candidate audio sample, a plurality of candidate utterances, each candidate utterance having an associated utterance type;
generating a respective candidate voice sample for each candidate audio sample by selecting, from the plurality of candidate utterances for the respective candidate audio sample, a set of candidate utterances having an utterance type distribution meeting at least one predetermined candidate utterance type criterion, wherein the utterance type distribution includes a frequency of the associated utterance type, wherein the primary utterance type criterion and candidate utterance type criterion are the same;
determining, using a neural network, an embedding for the primary voice sample, the embedding providing a multidimensional numeric representation of acoustic features of the primary voice sample;
determining, using the neural network, a respective embedding for each candidate voice sample, each respective embedding providing a multidimensional numeric representation of acoustic features of such candidate voice sample;
generating, for each candidate voice sample, a similarity score relative to the primary voice sample, the similarity score being a function of the embedding of such candidate voice sample and the embedding of the primary voice sample;
comparing the similarity score to a threshold; and
in response to determining that the similarity score exceeds the threshold, identifying a specific candidate speaker as providing a vocal match to the primary speaker based on the similarity scores of the candidate voice samples.

2. The method of claim 1, further comprising the steps of:
receiving dubbing audio from the identified particular candidate speaker in the target language; and
producing for a primary media including audio spoken by the primary speaker a localized version of the primary media including the dubbing audio from the identified particular candidate speaker as a localized version of the audio spoken by the primary speaker in the primary media.

3. The method of claim 1,
the at least one candidate utterance type criterion comprising presence of a first utterance type;
the step of generating a particular candidate voice sample for a particular candidate audio sample comprising the steps of:
identifying utterances in the particular candidate audio sample;
checking the identified utterances for presence of an utterance of the first utterance type;
in response to a determination that the particular candidate audio sample does not include an utterance of the first utterance type:
obtaining an additional utterance comprising speech by the candidate speaker associated with the particular candidate audio sample, the additional utterance being of the first utterance type; and
combining the additional utterance with at least one identified utterance in the candidate audio sample in the particular candidate voice sample.

4. The method of claim 3, the step of obtaining the additional utterance comprising retrieving the additional utterance from a media library.

5. The method of claim 1, wherein a particular candidate voice sample comprises a plurality of utterance groups including a first utterance group and a second utterance group, each utterance group complying with a respective predetermined candidate utterance type criterion.

6. The method of claim 5 wherein the particular candidate voice sample comprises a single audio file.

7. The method of claim 5, wherein the particular candidate voice sample comprises a plurality of audio files, each audio file including a respective utterance group.

8. The method of claim 5, wherein each respective predetermined candidate utterance type criterion requires the presence of a different respective utterance.

9. The method of claim 5, the step of determining using the neural network the embedding for the particular candidate voice sample comprising the steps of:
determining using the neural network a first embedding for the first utterance group of the particular candidate voice sample and a second embedding for the second utterance group of the particular candidate voice sample; and combining the first and second embeddings to generate the embedding for the particular candidate voice sample.

10. The method of claim 9, the step of combining the first and second embeddings comprises combining the first and second embeddings in a weighted manner using a first utterance type weight for the first embedding and a second utterance type weight for the second embedding.

11. The method of claim 5,
the step of determining using the neural network the embedding for the particular candidate voice sample comprising determining using the neural network a respective embedding for each utterance group;
the step of generating for the particular candidate voice sample the similarity score relative to the primary voice sample comprising the steps of:
generating a group similarity value between the respective embedding of each utterance group relative to the primary voice sample; and
combining the group similarity values to generate the similarity score for the particular candidate voice sample.

12. The method of claim 1, wherein the step of generating for a particular candidate voice sample the similarity score relative to the primary voice sample comprises applying a cosine similarity function to the embedding of the primary voice sample and the embedding of the particular candidate voice sample.

13. A computer-implemented system for automated voice casting comprising:
a computer processor;
a voice sample processing neural network in communication with the computer processor; and
a computer memory having instructions stored therein that, when executed by the processor, cause the processor to:
retrieve, from a media library, a primary audio sample comprising speech of a primary speaker in a primary language;
analyze the primary audio sample to identify a plurality of primary utterances therein, each primary utterance having an associated utterance type;
generate a primary voice sample for the primary audio sample by selecting, from the plurality of primary utterances, a set of primary utterances having an utterance type distribution meeting at least one predetermined primary utterance type criterion;
determine, using the neural network, an embedding for the primary voice sample, the embedding providing a multidimensional numeric representation of acoustic features of the primary voice sample;
retrieve, from the media library, a plurality of candidate audio samples each comprising speech from a respective candidate speaker in a target language different from the primary language;
identify, in each candidate audio sample, a plurality of candidate utterances, each candidate utterance having an associated utterance type;
generate a respective candidate voice sample for each candidate audio sample by selecting from the plurality of candidate utterances for the respective candidate audio sample, a set of candidate utterances having an utterance type distribution meeting at least one predetermined candidate utterance type criterion, wherein the utterance type distribution includes a frequency of the associated utterance type, wherein the primary utterance type criterion and candidate utterance type criterion are the same;
determine, using the neural network, a respective embedding for each candidate voice sample, each respective embedding providing a multidimensional numeric representation of acoustic features of such candidate voice sample;
generate, for each candidate voice sample, a similarity score relative to the primary voice sample, the similarity score being a function of the embedding of such candidate voice sample and the embedding of the primary voice sample;
compare the similarity score to a threshold; and
in response to determining that the similarity score exceeds the threshold, identify a specific candidate speaker as providing a vocal match to the primary speaker based on the similarity scores.

14. The system of claim 13, the at least one candidate utterance type criterion comprising presence of a first utterance type, the computer instructions further comprising instructions that cause the processor to:
identify utterances in the particular candidate audio sample;
check the identified utterances for presence of an utterance of the first utterance type;
in response to a determination that the particular candidate audio sample does not include an utterance of the first utterance type (i) obtain an additional utterance comprising speech by the candidate speaker associated with the particular candidate audio sample, the additional utterance being of the first utterance type, and (ii) include in the particular candidate voice sample the additional utterance and at least one identified utterance in the candidate audio sample.

15. The system of claim 13, the computer instructions further comprising instructions that cause the processor to obtain the additional utterance from the media library.

16. The system of claim 13, wherein the particular candidate voice sample has like utterance types grouped together.

17. The system of claim 13, wherein a particular candidate voice sample comprises a plurality of utterance groups, each utterance group complying with a different respective predetermined candidate utterance type criterion.

18. The system of claim 17, wherein the particular candidate voice sample comprises a single audio file.

19. The system of claim 17, wherein the particular candidate voice sample comprises a plurality of audio files, each audio file comprising a respective utterance group.

20. The system of claim 17, wherein each respective predetermined candidate utterance type criterion requires the presence of a different respective utterance.

21. The system of claim 17, the computer instructions further comprising instructions that cause the processor to determine an embedding for the particular candidate voice sample by:
determining using the neural network a respective embedding for each utterance group; and
combining the respective embeddings for the utterance groups.

22. The system of claim 21, wherein the respective embeddings for the utterance groups are combined in a weighted manner, wherein the weighting applied to each respective embedding is associated with the predetermined candidate utterance type criterion of the utterance group for the respective embedding.

23. The system of claim 17,
the computer instructions causing the processor to generate the embedding for the particular candidate by generating using the neural network a respective embedding for each utterance group; and
the computer instructions causing the processor to generate the similarity score for the particular candidate voice sample comprising instructions to:
generate a group similarity value between the respective embedding of each utterance group relative to the primary voice sample; and
combine the group similarity values to generate the similarity score for the particular candidate voice sample.

24. The system of claim 13, wherein the similarity function comprises a cosine similarity function.

25. The method of claim 1, wherein the primary utterances in the primary voice sample and the candidate utterances in each respective candidate voice sample are grouped in the respective voice sample by utterance type.

26. The method of claim 25, wherein each voice sample of the primary voice sample and the plurality of candidate voice samples comprises a respective first sample containing utterances of a first utterance type without utterances of a second utterance type and a respective second sample containing utterances of the second utterance type without utterances of the first utterance type.

27. The system of claim 13, wherein each voice sample of the primary voice sample and the plurality of candidate voice samples comprises a respective first sample containing utterances of a first utterance type without utterances of a second utterance type and a respective second sample containing utterances of the second utterance type without utterances of the first utterance type.

28. The method of claim 1, wherein the primary utterance type criterion and candidate utterance type criterion each comprise presence of at least one of an utterance type of excited utterance, catch phrase, and non-lexical utterance.

29. The system of claim 13, wherein the primary utterance type criterion and candidate utterance type criterion each comprise presence of at least one of an utterance type of excited utterance, catch phrase, and non-lexical utterance.

* * * * *